(12) United States Patent
Hossfeld

(10) Patent No.: US 8,284,469 B2
(45) Date of Patent: Oct. 9, 2012

(54) APPARATUS FOR READING FROM AND/OR WRITING TO HOLOGRAPHIC STORAGE MEDIA

(75) Inventor: Wolfgang Hossfeld, Villingen-Schwenningen (DE)

(73) Assignee: Thomson Licensing (FR)

( * ) Notice: Subject to any disclaimer, the term of this patent is extended or adjusted under 35 U.S.C. 154(b) by 301 days.

(21) Appl. No.: 12/077,702

(22) Filed: Mar. 20, 2008

(65) Prior Publication Data

US 2008/0259420 A1    Oct. 23, 2008

(30) Foreign Application Priority Data

Apr. 19, 2007  (EP) .................................. 07106464

(51) Int. Cl.
| | |
|---|---|
| G03H 1/12 | (2006.01) |
| G03H 1/16 | (2006.01) |
| G03H 1/22 | (2006.01) |
| G02B 5/32 | (2006.01) |

(52) U.S. Cl. ................. 359/11; 359/21; 359/29; 359/32
(58) Field of Classification Search .......................... None
See application file for complete search history.

(56) References Cited

U.S. PATENT DOCUMENTS

| | | | |
|---|---|---|---|
| 5,187,598 A * | 2/1993 | Posluszny et al. .............. 359/29 |
| 6,762,865 B1 | 7/2004 | Edwards | |
| 6,806,983 B2 * | 10/2004 | Long ............................... 359/35 |
| 7,369,286 B2 | 5/2008 | Mori et al. | |
| 7,535,608 B2 | 5/2009 | Kawano et al. | |
| 7,535,609 B2 | 5/2009 | Yasuda et al. | |
| 8,064,115 B2 | 11/2011 | Kasazumi et al. | |
| 2005/0174621 A1 | 8/2005 | Edwards | |
| 2005/0200928 A1 | 9/2005 | Mori et al. | |
| 2006/0176799 A1 | 8/2006 | Hirono | |
| 2007/0146838 A1 | 6/2007 | Toishi et al. | |
| 2008/0024848 A1 * | 1/2008 | Kawano et al. ................. 359/21 |

FOREIGN PATENT DOCUMENTS

| | | |
|---|---|---|
| EP | 1720158 | 11/2006 |
| EP | 1732068 | 12/2006 |
| JP | 2005292765 | 10/2005 |
| JP | 2005293630 | 10/2005 |
| JP | 2006/107663 | 4/2006 |
| JP | 2006338851 | 12/2006 |
| JP | 2007052354 | 3/2007 |
| JP | 2008262181 | 10/2008 |

OTHER PUBLICATIONS

"overlap," The Free Online Dictionary, http://www.thefreedictionary.com/overlap, Jun. 29, 2011.*
European Search Report dated Aug. 27, 2007.

* cited by examiner

*Primary Examiner* — Jade R Chwasz
(74) *Attorney, Agent, or Firm* — Jack Schwartz & Associates, PLLC

(57) ABSTRACT

An apparatus for reading a data page from and/or writing a data page to a holographic storage medium includes a common aperture arrangement of one or more reference beams and an object beam or a reconstructed object beam. One or more spatial light modulators are provided for generating the one or more reference beams by modulating a light beam with a modulation pattern having a spatial frequency higher than the spatial frequency of the data page.

13 Claims, 8 Drawing Sheets

APPARATUS FOR READING FROM AND/OR WRITING TO HOLOGRAPHIC STORAGE MEDIA

This application claims the benefit, under 35 U.S.C. §119, of European Patent Application No. 07106464.6 of 19 Apr. 2007.

FIELD OF THE INVENTION

The present invention relates to an apparatus for reading from and/or writing to holographic storage media, and more specifically to an apparatus for reading from and/or writing to holographic storage media using a simplified common aperture setup.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

Currently mainly three solutions for holographic storage systems are discussed. In the collinear system, as disclosed for example in EP 1 624 451, separate parts of the objective lens aperture are used for the object beam and the reference beam, respectively. This arrangement is a so-called coaxial system, i.e. the object beam and the reference beam run along the same axis. This system uses a kind of shift multiplexing as a multiplexing method.

In the off-axis recording system, as disclosed for example in U.S. Pat. No. 6,721,076, the object beam and the reference beam do not share the same optical path. In this system angle and polytopic multiplexing are used.

The basic idea of the common aperture recording system, which is described, for example, in WO 2006/003077, is that the object beam and the reference beam(s) fill the full aperture of the objective lens. The common aperture system is hence a special type of coaxial system. For read-out the beams are separated in the focal plane, i.e. the Fourier plane of the reconstructed hologram image. This is different from the collinear concept, where the object beam and the reference beam only fill a distinct part of the aperture and, as a consequence, are separated in the image plane of the hologram. The common aperture system allows to achieve a higher data capacity, but the setup is more complex and instable, as the object beam and the reference beam(s) have to be separated, formed and joined.

SUMMARY OF THE INVENTION

It is an object of the invention to propose an apparatus for reading from and/or writing to holographic storage media with a simplified common aperture setup.

According to the invention, this object is achieved by an apparatus for reading a data page from and/or writing a data page to a holographic storage medium, with a coaxial arrangement of one or more reference beams and an object beam or a reconstructed object beam, which has one or more spatial light modulators for generating the one or more reference beams by modulating a light beam with a modulation pattern having a spatial frequency higher than the spatial frequency of the data page.

The idea of the invention is to generate the object beam and the reference beam(s) for the common aperture recording system with one or more spatial light modulators. This is achieved by using special pixel patterns, where the data patterns, which code the binary data, are modulated with a reference beam pattern of a higher spatial frequency than the maximum spatial frequency of the data pattern. Thus the object beam and the reference beam can be separated in the Fourier domain, which is the basic principle of the common aperture system. The invention allows to realize the common aperture system without the need to separate and join the object beam and the reference beam by optical means. Both beams use the same optical path. The setup is thus much simplified and the system becomes more stable with regard to shocks and vibrations. In addition, the requirements for the coherence length of the laser can be lowered, because the optical path lengths for the object beam and the reference beam are automatically nearly the same.

According to a further aspect of the invention, the above advantages are likewise achieved by a method for writing a data page to a holographic storage medium using a coaxial arrangement of one or more reference beams and an object beam, which has the step of generating the one or more reference beams by modulating a light beam with a modulation pattern having a spatial frequency higher than the spatial frequency of the data page.

Similarly, the above advantages are also achieved by a method for reading a data page from a holographic storage medium using a coaxial arrangement of one or more reference beams and a reconstructed object beam, which has the step of generating the one or more reference beams by modulating a light beam with a modulation pattern having a spatial frequency higher than the spatial frequency of the data page.

Preferably, a single spatial light modulator is provided for modulating the light beam with a superposition of the data page and the modulation pattern. This has the advantage that the cost of the optical setup is reduced, as only one spatial light modulator is necessary.

Alternatively, two spatial light modulators are provided for modulating the light beam in series with the data page and the modulation pattern. Ideally both spatial light modulators are arranged in parallel close to each other in the object plane. It is not significant whether the modulation pattern or the data page are imprinted on the light beam first. This solution has the advantage that different types of spatial light modulators may be used, e.g. having different pixel sizes or different switching times. In addition, the spatial light modulator for imprinting the modulation pattern can likewise be static, i.e. it may have a fixed modulation pattern. In this case a simple phase or amplitude mask is preferably employed.

Preferentially, the data pixels of the data page are formed by groups of pixels of the one or more spatial light modulators. This easily allows to use the same spatial light modulator or at least the same type of spatial light modulator for imprinting both the modulation pattern and the data page on the light beam.

Advantageously, the reconstructed object beam is separated from the one or more reference beams by a spatial filter. This spatial filter is located in a Fourier plane. As the object beam and the one or more reference beams have different spatial frequencies, they are spatially separated in and close to the Fourier plane. Consequently, a spatial filter such as an aperture allows to separate the beams in a cheap and efficient way.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

In the following description reference is made to transmission type holographic storage systems with two reference beams. Of course, the idea is also applicable to reflection type holographic storage systems, where the data is recorded and read from only one side of the holographic storage medium. Furthermore, only a single reference beam or more than two reference beams may be used.

Figure 1:
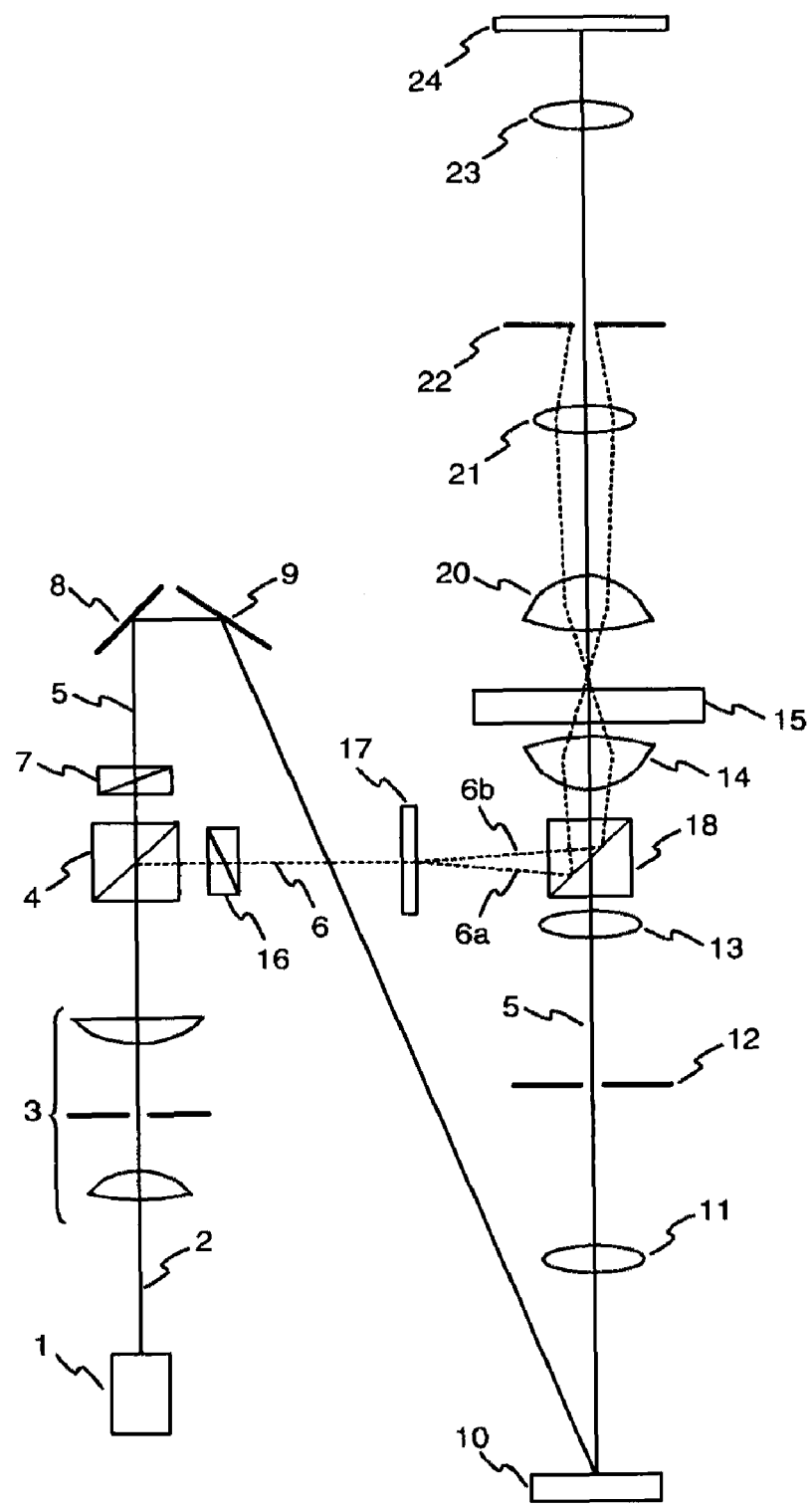
FIG. 1 shows a known transmission type apparatus for reading from and writing to holographic storage media during the writing operation.

An exemplary setup of a known common aperture apparatus for reading from and writing to holographic storage media is shown in FIG. 1. For simplification only the principal rays of the light beams are illustrated. A source of coherent light, e.g. a laser diode 1, emits a light beam 2, which is collimated, expanded and filtered by a beam expander and filter arrangement 3. The light beam 2 is then divided into two separate light beams 5, 6 by a beam splitter 4. The first light beam 5, the so called "object beam", passes a beam shutter 7 and is directed by two mirrors 8, 9 towards a spatial light modulator (SLM) 10. The SLM 10 modulates the light beam 5 to imprint a 2-dimensional data pattern. The object beam 5 is filtered by a pair of Fourier lenses 11, 13 and a spatial filter 12, which filters out the high frequency components of the object beam 5. The object beam 5 is then focused into a holographic storage medium 15, e.g. a holographic disk or card, by an objective lens 14. The second light beam 6, the reference beam, also passes a beam shutter 16 before it impinges on a partial beam generating element 17, e.g. a bi-prism or a diffractive element. The partial beam generating element 17 generates two or more partial reference beams 6a, 6b from the reference beam 6. The partial beam generating element 17 is designed in such a way that the foci of the two partial reference beams 6a, 6b lie besides the focal area of the object beam 5. The partial reference beams 6a, 6b are coupled into the optical path of the object beam 5 by a beam coupling element 18, e.g. a beam splitter, and focused into the holographic storage medium 15 by the objective lens 14. At the intersection of the object beam 5 and the partial reference beams 6a, 6b an interference pattern appears, which is recorded in a photo-sensitive layer of the holographic storage medium 15.

Figure 2:
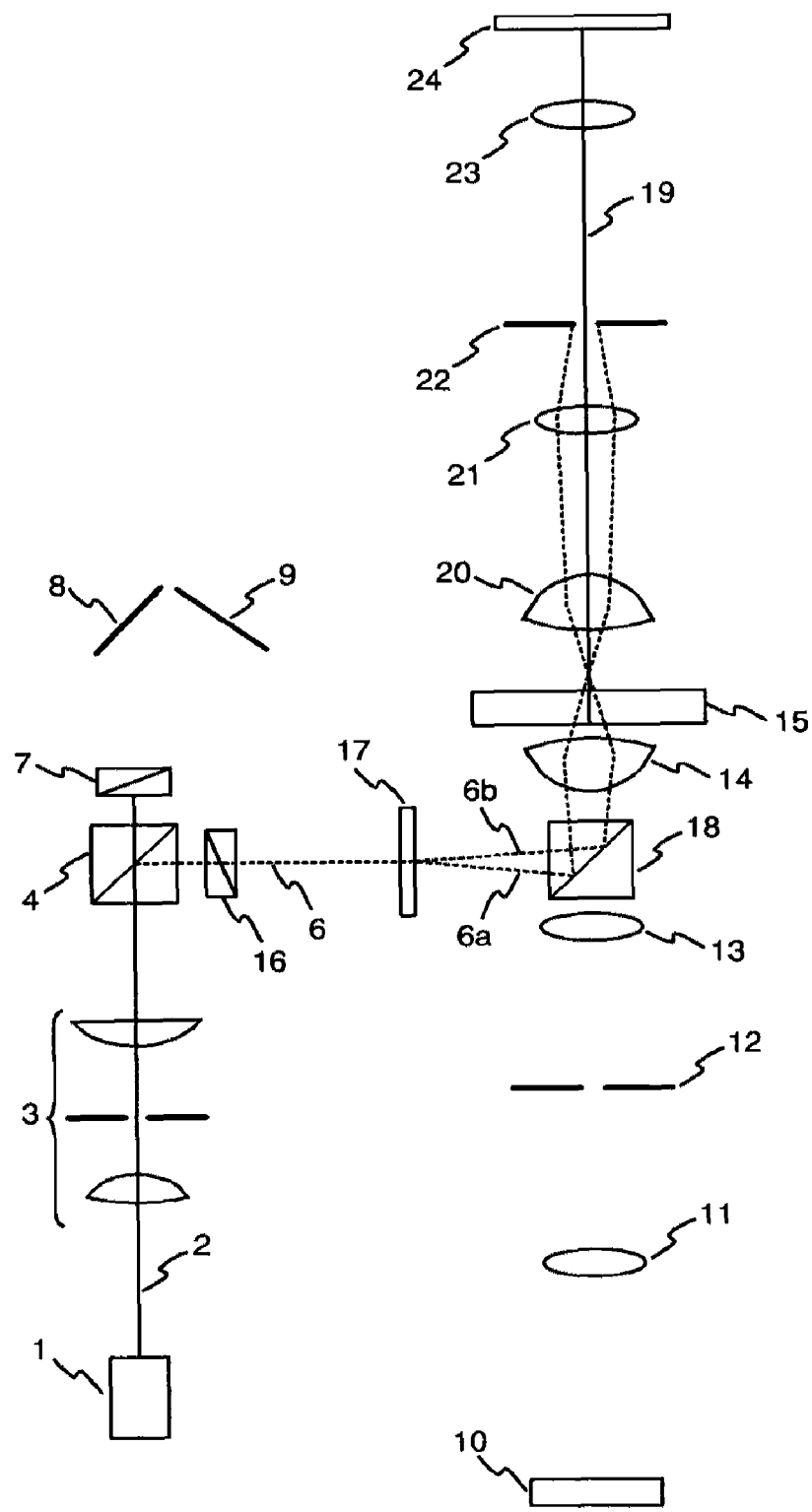
FIG. 2 shows the apparatus of FIG. 1 during the reading operation.

As shown in FIG. 2, the stored data are retrieved from the holographic storage medium 15 by illuminating a recorded hologram with the partial reference beams 6a, 6b only. For this purpose the object beam 5 is blocked by the beam shutter 7. The partial reference beams 6a, 6b are diffracted by the hologram structure and produce a copy of the original object beam 5, the reconstructed object beam 19. This reconstructed object beam 19 is collimated by an objective lens 20 and directed onto a 2-dimensional array detector 24, e.g. a CCD-array. A further pair of Fourier lenses 21, 23 and a further spatial filter 22 block the partial reference beams 6a, 6b. The spatial filter 22 is advantageously also used for filtering out the high frequency components of the reconstructed object beam 19. The array detector 24 allows to reconstruct the recorded data.

Figure 3:
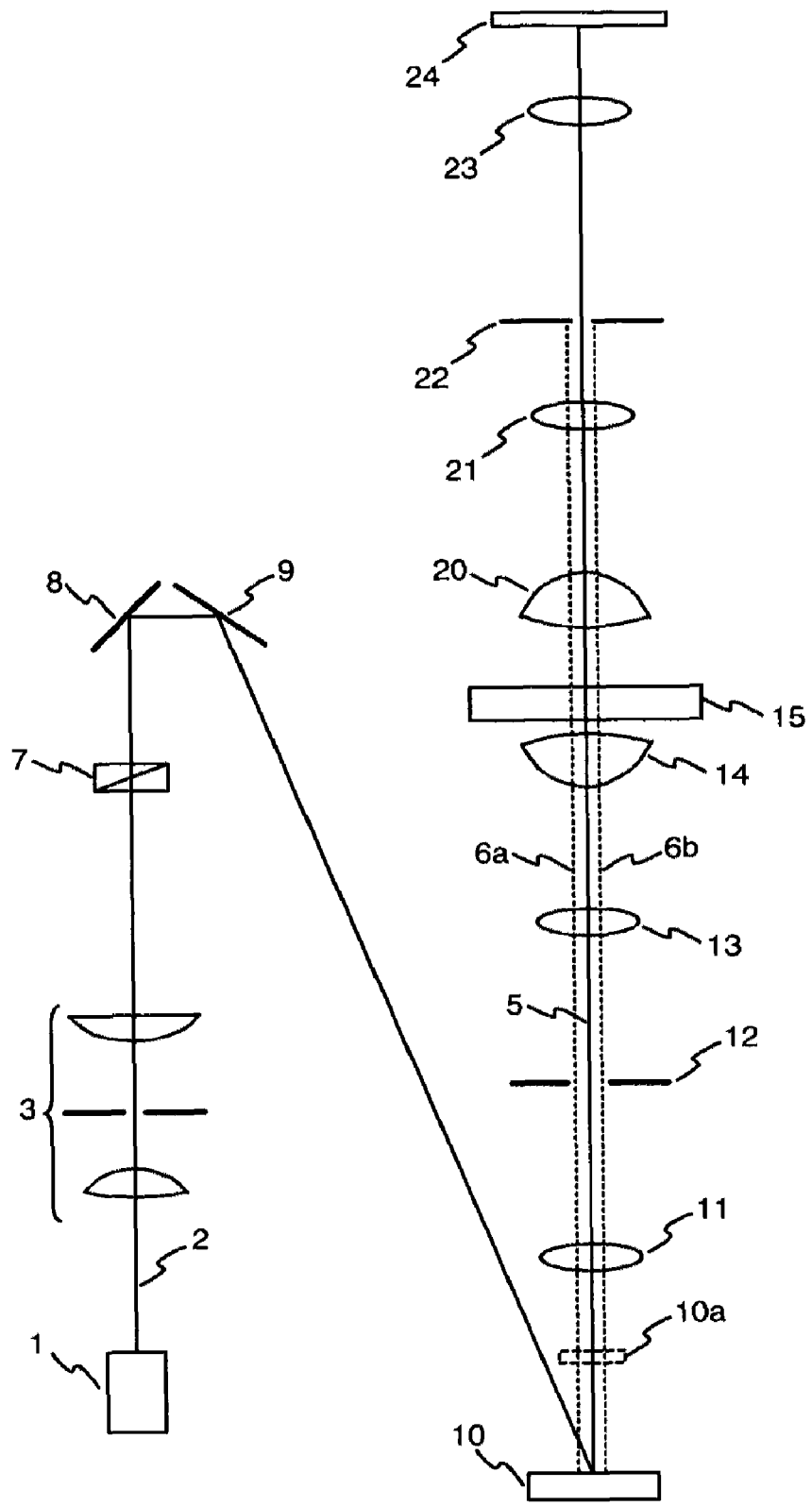
FIG. 3 illustrates a common aperture apparatus for reading from and/or writing to holographic storage media according to the invention.

In order to simplify the generation of the reference beams 6a, 6b and the separation of the reference beams 6a, 6b and the reconstructed object beam 19, the main idea of the invention is to generate the object beam 5 and the reference beams 6a, 6b with the SLM 10. The SLM 10 may be a phase or amplitude SLM. It is likewise possible to apply more than one SLM 10 in series. The corresponding common aperture setup is illustrated in FIG. 3. The setup is essentially the same as the setup of FIG. 1. However, the reference beam path is omitted, which simplifies the optical setup. Instead, the reference beams 6a, 6b are generated by modulating the data pattern with an additional pattern, which mainly consists of higher spatial frequencies than the data pattern. This is either done by the same SLM 10 as used for imprinting the data page on the light beam 2, or by an additional SLM 10a (indicated by the dashed rectangle). Of course, in the latter case the SLM 10 can likewise be used for imprinting the modulation pattern, whereas the additional SLM 10a imprints the data page. The high frequency modulation pattern acts as a reference beam 6a, 6b for the common aperture holography. As a consequence, the spatial filter 12 is modified such that it does not filter out the spatial frequencies of the modulation pattern, i.e. the diameter of the aperture is increased. Of course, it is likewise possible to modify the spatial filter 12 in such way that only one reference beam 6a, 6b is passed. In the figure, the spatial separation of the object beam 5 and the reference beams 6a, 6b is for illustration purposes only.

Figure 4:
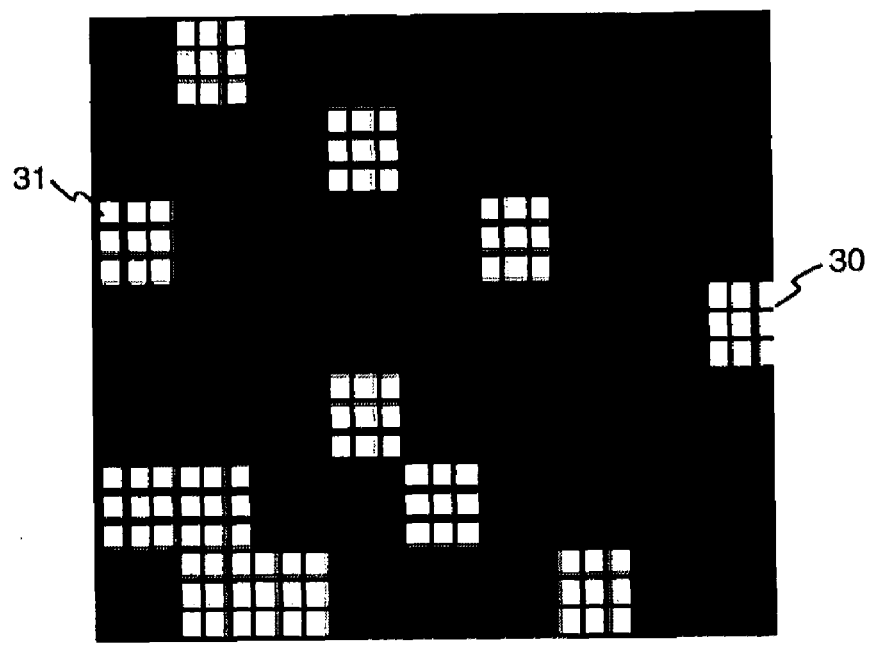
FIG. 4 illustrates an example of a data pattern, where each data pixel is formed by 3×3 SLM pixels.

In the following specific embodiment a one-dimensional modulation of the data pattern is realized by generating one data pixel with several pixels of a single SLM 10. An example of a data pattern is shown in FIG. 4. In this case one data pixel 30 is formed by 3×3 SLM pixels 31. A channel bit '1' corresponds to 3×3 bright pixels, whereas a channel bit '0' corresponds to 3×3 dark pixels.

Figure 5:
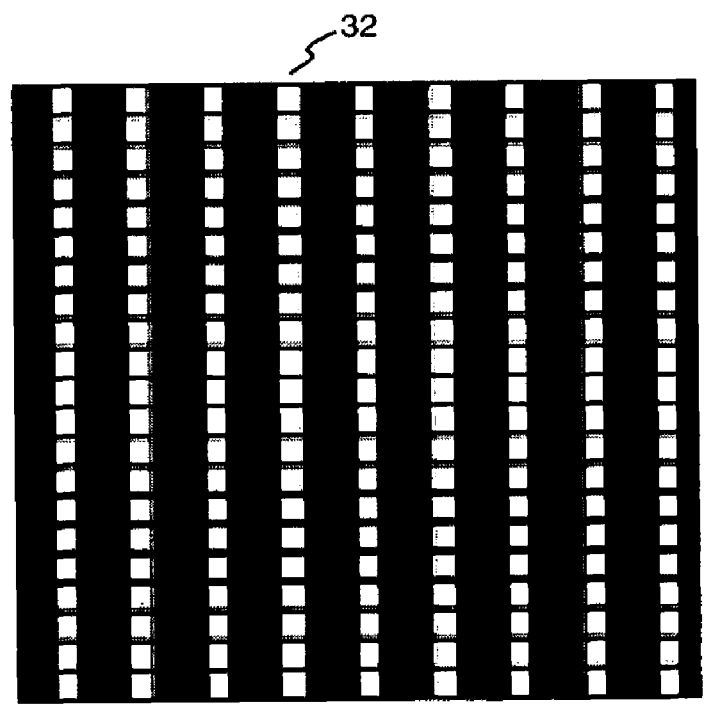
FIG. 5 illustrates a modulation pattern for generating reference beams.

An example of a one-dimensional amplitude modulation pattern 32 is shown in FIG. 5. The modulation pattern 32 consists of lines of bright pixels with a width of one pixel, which are separated by two dark pixels. As a consequence the spatial frequency of the modulation pattern 32 is higher than the spatial frequency of the data pattern. Of course, other types of modulation patterns 32 can likewise be used, as long as they exhibit a sufficiently large fraction of high spatial frequencies compared to the spatial frequency of the data pattern. For example, the modulation pattern 32 may be a 2-dimensional grating, or a stochastic or pseudo-stochastic structure such as a grating with variable line distances. Apart from an amplitude modulation pattern 32 also a phase modulation pattern may be used, e.g. a grating with a sinusoidal phase modulation. The latter has the advantage that ideally no zeroth order is generated, which simplifies the separation of the light beams 5, 6a, 6b in the Fourier plane.

Figure 6:
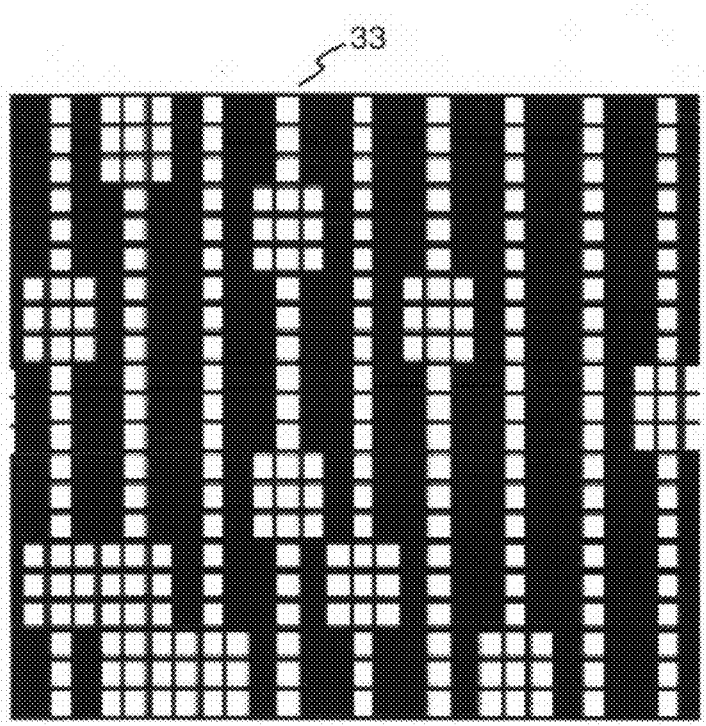
FIG. 6 shows the data page resulting from the superposition of the data pattern and the modulation pattern.

The final data page 33, which results from the superposition of the data pattern and the modulation pattern 32, is illustrated in FIG. 6. This pattern 33 is applied by the SLM 10 to the light beam 2 emitted by the light source 1. As can be derived from the figure, in order to reduce the number of pixels of the SLM 10 the pixels are preferably adapted to the modulation pattern. In the specific example, rectangular pixels with a size corresponding to three vertically adjacent square pixels could be used.

Figure 7:
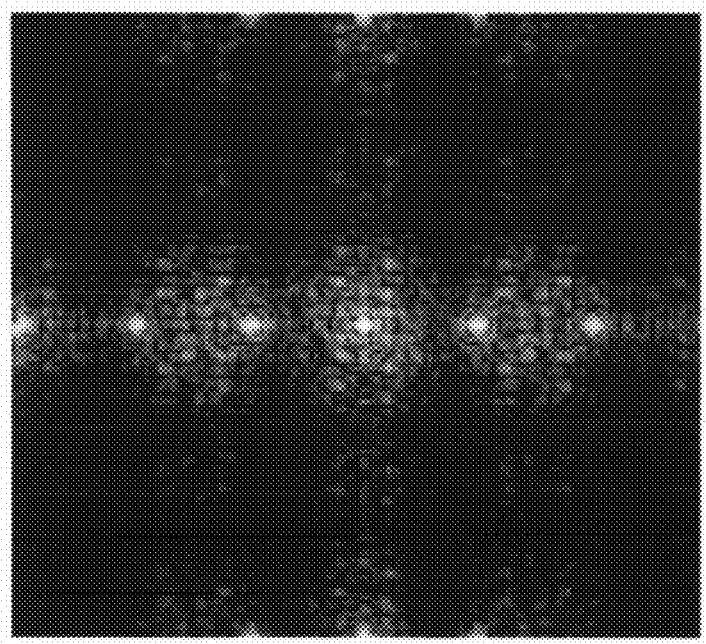
FIG. 7 illustrates the intensity distribution resulting from the data page of FIG. 6 in the focal plane of a first Fourier lens.

The intensity distribution in the focal plane of the first Fourier lens 11 resulting from the final data page 33 of FIG. 6 is shown in FIG. 7 in logarithmic scale with arbitrary units. Three regions of higher intensity can be identified. The central region is generated by the lower frequency content of the signal, i.e. mainly the data pattern. The regions at the sides of the central region result from the high-frequency content, i.e. mainly the modulation pattern 32. This separation of the data pattern and the modulation pattern 32 is also found in the focal plane of the third Fourier lens 21 and makes it possible to separate the reconstructed object beam 19 and the reference beam 6a, 6b in this plane.

Figure 8:
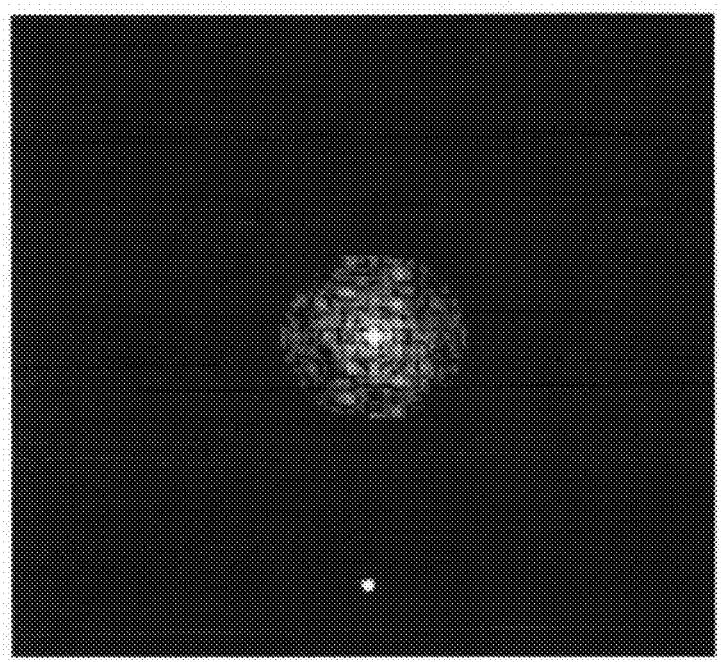
FIG. 8 shows the intensity distribution of a reconstructed object beam in the focal plane of a third Fourier lens after spatial filtering.

For reading, only the modulation pattern 32 of FIG. 5 is applied to the light beam 2 by the SLM 10. The original data pattern is then reconstructed by the hologram stored in the holographic storage medium 15. In order to filter out the reference beams 6a, 6b the aperture of the spatial filter 22 between the holographic storage medium 15 and the array detector 24 is chosen such that the intensity peaks resulting from the reference beam 6a, 6b in the focal plane of the third Fourier lens 21 are blocked. FIG. 8 shows an intensity plot of the remaining intensity distribution in this focal plane behind the aperture of the spatial filter 22 in logarithmic scale with arbitrary units.

Figure 9:
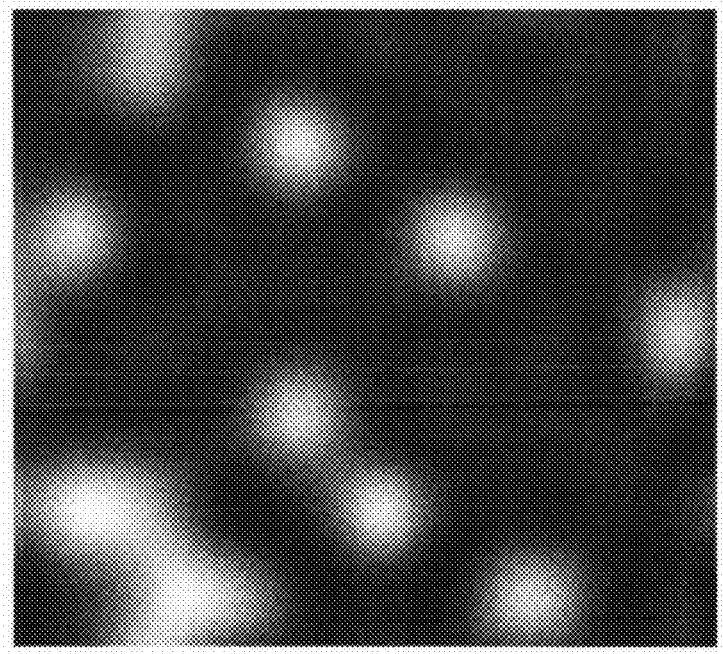
FIG. 9 illustrates the intensity distribution of the reconstructed object beam in the image plane on the array detector.
Figure 10:
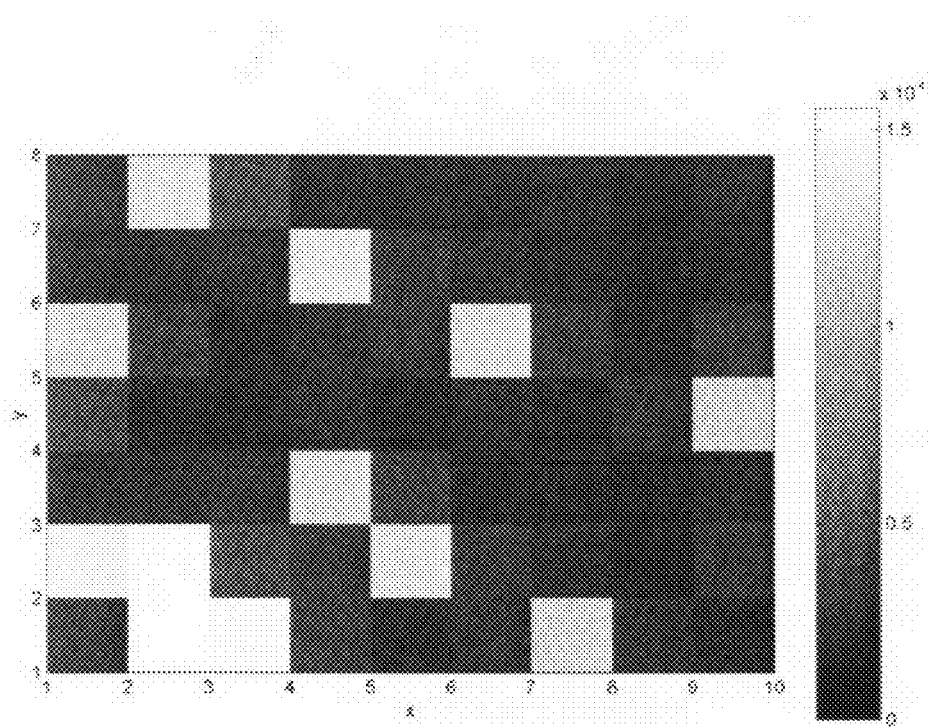
FIG. 10 shows the image obtained by the array detector.
Figure 11:
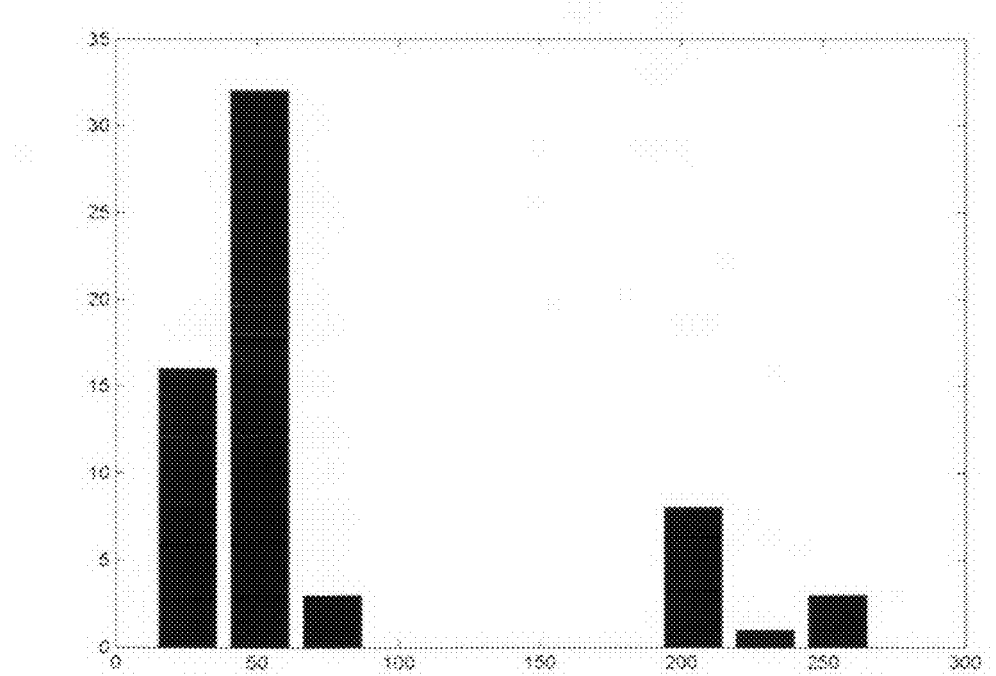
FIG. 11 illustrates the histogram of the detector values of FIG. 10.
Figure 12:
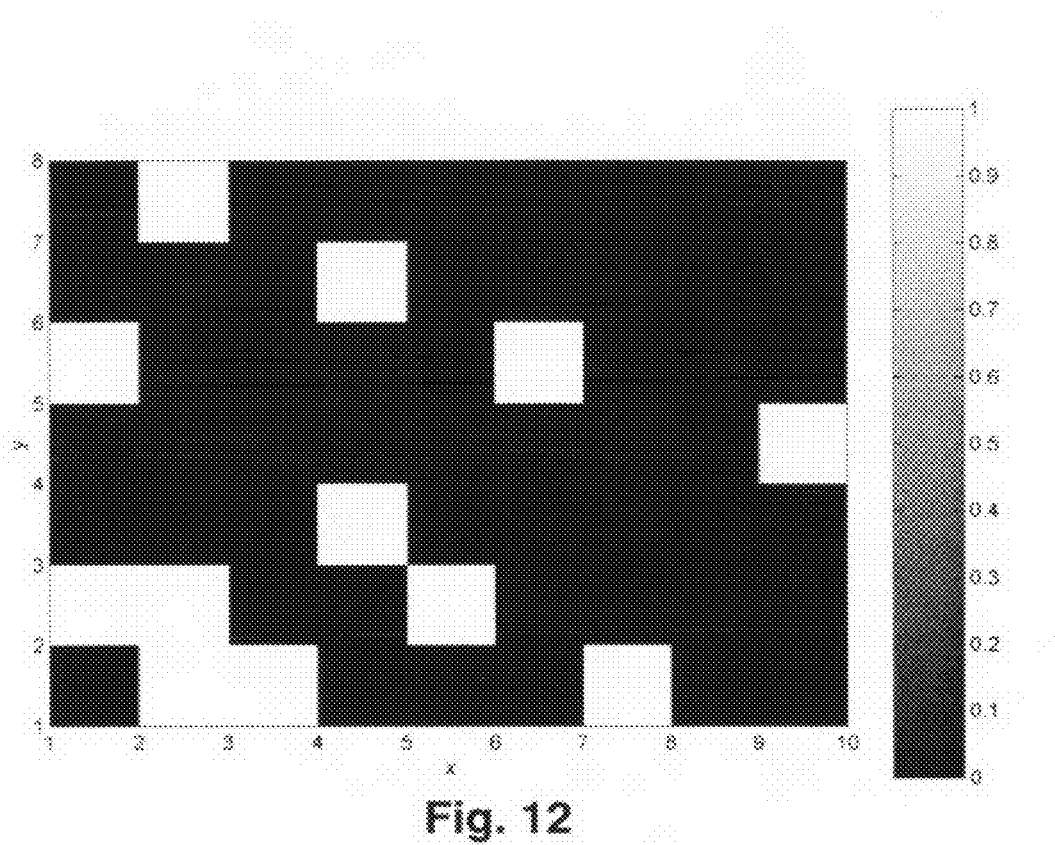
FIG. 12 depicts retrieval of the initially stored binary data through slicing.

The resulting signal intensity distribution in the image plane on the array detector 24 is depicted in FIG. 9. As can be seen the high-frequency content of the reference beams is completely filtered out. The data signal can thus be recovered without being disturbed by the signal of the reference beams 6a, 6b. In this specific embodiment this is done by detecting the signal with an array detector 24 that is chosen and adjusted in such a way that each data pixel 30, which consists of 3×3 SLM pixels 31, falls on one detector pixel. The resulting image obtained by the array detector 24 is shown in FIG. 10. The binary data coded by the initial data pattern of FIG. 4 are recovered by simple slicing. For this purpose an intensity level, i.e. a slice level, has to be determined. The slice level decides if a pixel value is detected as a bright or a dark pixel, i.e. as '1' or '0' of the channel code. For example, the slice level can be determined from the histogram of the detector values, which is shown in FIG. 11. It can be seen that the bright and dark pixels are well separated and a slice level can easily be determined. After slicing the initially stored binary data are retrieved. This is illustrated in FIG. 12.

What is claimed, is:

1. An apparatus for writing a data page with a data pattern to a holographic storage medium, with a common aperture arrangement of an object beam and one or more reference beams, wherein the apparatus comprises:
   a light source for generating a light beam;
   one or more spatial light modulators for imprinting a pattern onto the light beam to generate the object beam and the one or more reference beams, wherein said pattern is a superposition of the data pattern of the page and a modulation pattern having a spatial frequency higher than a spatial frequency of the data pattern; and
   a pair of Fourier lenses and a spatial filter arranged in a common focal plane of the pair of Fourier lenses for filtering the object beam and the one or more reference beams; and
   a Fourier objective lens for illuminating the one or more reference beams and the object beam carrying the data page into the holographic storage medium, wherein the same portion of the Fourier objective lens is used for illuminating the one or more reference beams and the object beam into the holographic storage medium.

2. The apparatus according to claim 1, wherein the apparatus comprises a single spatial light modulator for modulating the light beam with a superposition of the data pattern of the data page and the modulation pattern.

3. The apparatus according to claim 1, wherein the apparatus comprises two spatial light modulators for modulating the light beam in series with the data pattern of the data page and the modulation pattern.

4. The apparatus according to claim 3, wherein the spatial light modulator for modulating the data pattern of the data page with the modulation pattern has a fixed modulation pattern.

5. The apparatus according to claim 3, wherein the spatial light modulator for modulating the data pattern of the data page with the modulation pattern is a phase mask or an amplitude mask.

6. The apparatus according to claim 1, wherein data pixels of the data page are formed by groups of pixels of the one or more spatial light modulators.

7. A method for writing a data page with a data pattern to a holographic storage medium, with a common aperture arrangement of an object beam and one or more reference beams, the method comprising the steps of:
   generating a light beam;
   imprinting a pattern onto the light beam for generating an object beam;
   and the one or more reference beams, wherein the pattern is a superposition of the data pattern of the page and a modulation pattern having a spatial frequency higher than a spatial frequency of the data pattern;

filtering the object beam and the one or more reference beams with a pair of Fourier lenses and a spatial filter arranged in a common focal plane of the pair of Fourier lenses; and illuminating the one or more reference beams and the object beam into the holographic storage medium with a Fourier objective lens, wherein the same portion of the Fourier objective lens is used for illuminating the one or more reference beams and the object beam into the holographic storage medium.

8. The method according to claim 7, wherein the light beam is modulated with a superposition of the data pattern of the data page and the modulation pattern.

9. The method according to claim 7, wherein the light beam is modulated in series with the data pattern of the data page and the modulation pattern.

10. A method for reading a data page with a data pattern from a holographic storage medium, with a common aperture arrangement of an object beam and one or more reference beams, the method comprising the steps of:

generating a light beam;

generating one or more reference beams by modulating an inner area of the light beam, the inner area comprising an optical axis of the light beam, with a modulation pattern having a spatial frequency higher than a spatial frequency of the data pattern of the data page;

filtering the object beam and the one or more reference beams with a pair of Fourier lenses and a spatial filter arranged in a common focal plane of the pair of Fourier lenses; and illuminating the one or more reference beams into the holographic storage medium with a Fourier objective lens for generating a reconstructed object beam carrying the data page;

collimating the reconstructed object beam and portions of the one or more reference beams travelling along the reconstructed object beam with a collimating lens, wherein the same portion of the collimating lens is used for collimating the reconstructed object beam and the portions of the one or more reference beams travelling along the reconstructed object beam; and retrieving the data page from the reconstructed object beam with a detector.

11. The method according to claim 10, further comprising the step of separating the reconstructed object beam from the portions of the one or more reference beams travelling along the reconstructed object beam by spatial filtering.

12. An apparatus for reading a data page with a data pattern from a holographic storage medium, with a common aperture arrangement of an object beam and one or more reference beams, wherein the apparatus comprises:

a light source for generating a light beam;

a spatial light modulator for generating one or more reference beams by modulating an inner area of the light beam, the inner area comprising an optical axis of the light beam, with a modulation pattern having a spatial frequency higher than a spatial frequency of the data pattern of the data page;

a pair of Fourier lenses and a spatial filter arranged in a common focal plane of the pair of Fourier lenses for filtering the object beam and the one or more reference beams;

a Fourier objective lens for illuminating the one or more reference beams into the holographic storage medium for generating a reconstructed object beam carrying the data page;

a collimating lens for collimating the reconstructed object beam and portions of the one or more reference beams travelling along the reconstructed object beam, wherein the same portion of the collimating lens is used for collimating the reconstructed object beam and the portions of the one or more reference beams travelling along the reconstructed object beam; and a detector for retrieving the data page from the reconstructed object beam.

13. The apparatus according to claim 12, further comprising a spatial filter in a Fourier plane for separating the reconstructed object beam from the portions of one or more reference beams travelling along the reconstructed object beam.

* * * * *